United States Patent
Araujo

(10) Patent No.: US 8,215,941 B2
(45) Date of Patent: Jul. 10, 2012

(54) INTERCHANGEABLE SUPPORT SYSTEM FOR MULTI-COMPONENT INJECTION MOLDS

(75) Inventor: Paulo Juliano Araujo, Marinha Grande (PT)

(73) Assignee: PLASDAN—Automacao e Sistemas, Lda. (PT)

( * ) Notice: Subject to any disclaimer, the term of this patent is extended or adjusted under 35 U.S.C. 154(b) by 703 days.

(21) Appl. No.: 11/996,745

(22) PCT Filed: Nov. 8, 2006

(86) PCT No.: PCT/PT2006/000027
§ 371 (c)(1),
(2), (4) Date: Jan. 24, 2008

(87) PCT Pub. No.: WO2007/055607
PCT Pub. Date: May 18, 2007

(65) Prior Publication Data
US 2008/0193586 A1 Aug. 14, 2008

(30) Foreign Application Priority Data

Nov. 11, 2005 (PT) .......................................... 103381

(51) Int. Cl.
*B28B 17/00* (2006.01)
*B29C 45/06* (2006.01)
(52) U.S. Cl. .................... 425/192 R; 425/572; 425/112; 425/127; 425/576

(58) Field of Classification Search .................. 425/572, 425/112, 127, 576, 190, 192 R, 234
See application file for complete search history.

(56) References Cited

U.S. PATENT DOCUMENTS

| | | | | | |
|---|---|---|---|---|---|
| 3,224,043 | A | * | 12/1965 | Sieben et al. | 425/134 |
| 4,330,257 | A | * | 5/1982 | Rees et al. | 425/556 |
| 6,139,305 | A | * | 10/2000 | Nesch | 425/130 |
| 7,670,125 | B2 | * | 3/2010 | Armbruster | 425/123 |
| 2002/0101005 | A1 | * | 8/2002 | Bodmer et al. | 264/255 |

* cited by examiner

*Primary Examiner* — Maria Veronica Ewald
(74) *Attorney, Agent, or Firm* — Galbreath Law Offices, P.C.; John A. Galbreath

(57) ABSTRACT

The present invention refers to an interchangeable system for support and actuation of rotary injection molds, used for the manufacture of plastic multi-component parts. This system is easily installed on conventional injection molding machines. The support system (13) is constituted by a main body that includes a sliding device and a rotary mechanism. The longitudinal sliding device is driven by cylinders (8 and 23) and is supported by the arms of the support (9, 15). A rotary unit, including motorization (20) is coupled to the sliding device with two rotary support platens, upper (7) and lower (17). The central mold (4) is supported between the rotary support platens (7 and 17). The frontal mold (12) is fixed on the interior part of the support which is in-turn fixed to the machine platen. The rear mold (2) is fixed to the moving platen of the injection machine (1) as usual. The invention permits not only a rapid mold mutation but also an easy reinstallation on different injection machines.

1 Claim, 2 Drawing Sheets

INTERCHANGEABLE SUPPORT SYSTEM FOR MULTI-COMPONENT INJECTION MOLDS

Figure 1:
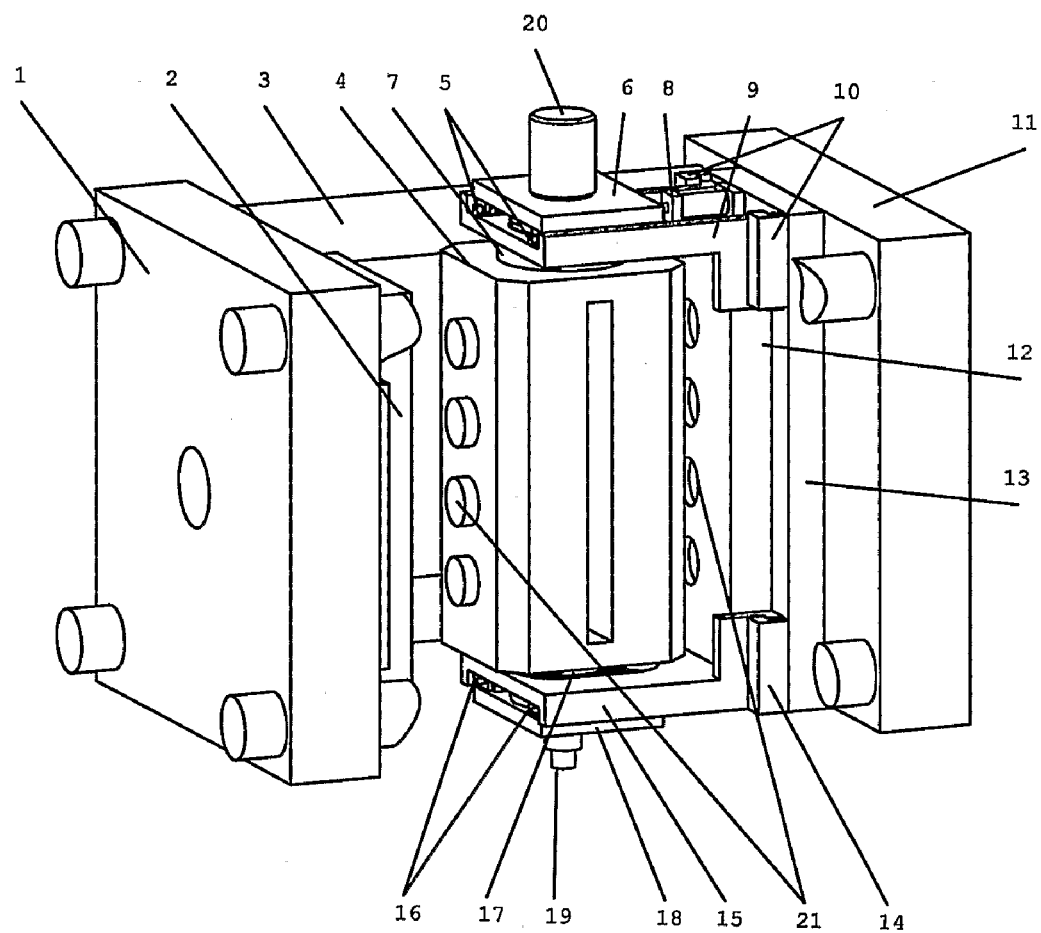

The process and technology for injection molding of plastic parts has increased dramatically in recent years. Multi-component technology has reached a critical mass, driven by modern product design, requiring a multiple materials; Industries such as toys, automobiles, consumer, packaging and appliance, where multiple appealing colors or hard/soft material combinations improve the appearance and feel of the products. There are examples, part of our daily routine, such as a two component simple toothbrush; In addition to the aesthetic and ergonomic properties of multi-component molding, there are many applications where this technology allows more efficient production of technical parts, such as seals and valves.

Another application of the multi-component technology is the production of articles with movable components, such as sliding joints or hinges through the choice of non-bonding polymer materials or the appropriate control of the process, so that the materials don't bond.

Consequently the most significant advantage of using multi-component technology is the possibility to produce articles with different texture, color or functionality combinations in a single manufacturing operation, not needing an assembly after the molding process. This process results in obvious benefits, including economic advantages.

There are various multi-component production processes available, depending on the results desired.

1) Bi-injection, co-molding, sandwich molding or "melt merging" processes: where the components are injected simultaneously or in sequence for one cavity, using two independent injection units;
2) "Core-back" process: where, after the injection and cooling of the first component, actuation of a portion of the mold, and the opening of a valve permits the injection of a second material in the same cavity.
3) Transfer molding process: the first component is injected in the mold on a machine and thereafter transferred to another mold cavity in the same machine or on a second machine, where the second component is injected. This transfer can be manual or automatic through a proper device.
4) Rotary processes: the multi-component process is accomplished in one mold and one injection molding machine. The first component is injected and rotated to another cavity where the injection of the second component occurs; Depending on the part's geometry, its size and the machine's clamping force, various methods of rotation are used:
Rotation with an "index plate", or rotary tables integrated in the tool or on the machine; The advantages of rotary molds and tables in comparison with formerly described processes, are less cycle time, and more economical production on one molding machine with multiple injection units.
5) "Rotary stack molding" process: this process is similar to traditional stack molding—where there are multiplies of parting planes used. This type of mold allows, at a minimum, double the number of cavities, therefore double the parts production, from a given machine. In a "rotary stack molding" system, the center portion of the mold rotates, allowing one component or material to be molded one parting plane and another materials to be molded on the second parting plane. The more recent systems based on this process introduce a central rotary block in the tool, that rotates on a vertical axis. This system of multi-component molding also allows for the production of large/long parts that would need a much larger machine using the previously described rotating systems. In summary, "rotary stack mould" systems allow either double the production or the use of significantly smaller capital equipment than previously described rotary systems.

These "rotary stack mold" systems, in spite of all the advantages mentioned, frequently have the disadvantage of high set-up or mold change times because of their complexities.

Modern industry knows that "time is money" and requires minimal equipment changeover times for production operations.

There are solutions that attempt to address these complex issues, allowing quick changes of molds therefore eliminating down time. Some invention in this area are known, such as patent U.S. Pat. No. 6,558,149, US2002/0101005 and others. These examples described mold support systems with incorporated functionalities such as the oil, water and electrical supply. These rotary support systems have the inconvenience of being dependent on the machine in which they are installed.

Figure 2:
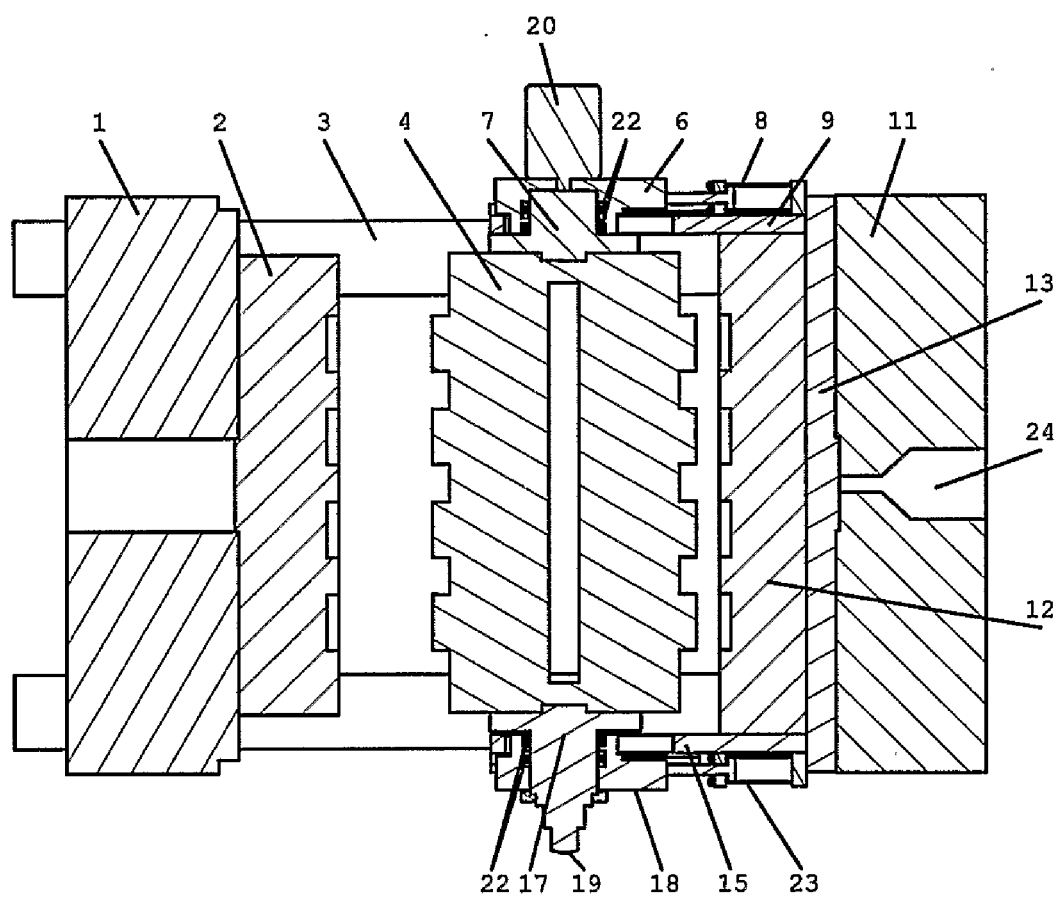

The principal component of our invention is a support system in the form of a "C" (13) on the FIGS. 1 and 2, which its basic functionality and constitution permits the easy installation and start-up of tools, used in the production of multi-shot articles.

The present invention, next to the advantages mentioned before, is easily reinstalled on whatever other injection molding machine. This is possible, as it is independent of the injection machine.

It is the objective of this invention to demonstrate an interchangeable support system with an integrated rotary system, for rotary stack molds, used for the production of multi-component articles, independent of the injection molding machine.

The invention herein described is related to an interchangeable support device that significantly improves the productivity of multi-component molding systems; as it provides for easy installation of the molds, as well as the substantial improvement of the installation time of the entire system into different injection machines.

The invention herein described in a simplified manner, is based on the fact that the whole support system is fixed only one of the machine platens, thus allowing the rapid transferal of the equipment to another injection molding machine, if necessary. The fact that there exists a support (13) in the shape of a "C" with arms in right angle adjustable to the mold, integrating the mechanisms necessary for the functioning of the mold, permits rapid mold changes. Since the support system is fixed on one of the machine platens (11 FIG. 1 and FIG. 2), rapid removal and reinstallation into a different injection molding machine can be easily and simply accomplished.

The invention, INTERCHANGEABLE SUPPORT SYSTEM, consisting of an interchangeable support (13) with a rectangular frame, having two parallel "arms", or plates perpendicular to the interchangeable support, each one equipped with a sliding device and a rotary device; The sliding device is driven by an hydraulic cylinder, allowing its longitudinal movement; A rotary unit is coupled to this system, that consists of an independent motor and gear drive (20) and two support plates, a upper (7) and another lower one (17); The central rotating portion of the stack mold, designed by central stack mold (4) is installed between the rotating support plates (7 and 17), which moves longitudinally by action of the sliding device and rotates around the INTERCHANGEABLE SUPPORT (13). This assembly is installed on the clamping unit, in the fixed platen of the injection machine (11); in the interior part of the interchangeable support, one of the mold cavity halves, appointed as frontal mold (12) is fixed. The other cavity side of the mold, for the second material being appointed as rear mold (2), is fixed to the moving platen of the injection machine (1), as usually.

Various other features of the present invention will be apparent from the description herein below, through a production example and reference to the drawings, FIG. 1 general view in perspective and FIG. 2, vertical section view. These simplified views are meant to be enunciatively and in no case limitative:

Referring to FIG. 1, the present invention consists of the support (13), which is removable and interchangeable, used in the molding of multi-component items. The INTERCHANGEABLE SUPPORT (13) is mounted on the injection moulding machine fixed platen (11), FIG. 1 shows the installation of a mold comprising the main parts known as; front mold (12), central stack mould (4) and rear mould (2); The front mould (12) is installed in the interior side of the INTERCHANGEABLE SUPPORT (13) in the area adjacent to the machine fixed platen (11); The central stack mold (4) is fixed to the rotary support plates, upper (7) and lower (17), while the rear mould (2) is fixed, as usual, to the injection molding machine moving platen (1).

The upper (6) and lower (18) sliding plates are coupled via the upper guide ways (5) and lower guide ways (16) respectively to the tops of the upper (9) and lower (15) fixed plates of INTERCHANGEABLE SUPPORT (13) thereby permitting the longitudinal movement of the central stack mould (4); These plates are moved by upper (8) and lower (23 FIG. 2) hydraulic cylinders, that allow for simultaneous and equal movement of the upper (6) and lower (18) sliding plates.

Coupled by bearings (22 FIG. 2) to both the upper (6) and lower (18) sliding plates, are the upper (7) and lower (17) rotating support plates respectively where the central stack mold (4) is fixed; the upper rotating support plate (7) is driven by a motor and gear drive (20) thereby permitting the rotation of the central stack mould (4).

At the start of the injection cycle, the front mold (12) and the rear mould (2) are closed and clamped around the central stack mould (4); The cavities (21) between the opposite sides of the front (12) and the central stack mold (4) define the first component to be injected with a second component between the central stack mould (4) and the rear mould (2). The material can therefore be injected into the cavities previously described, while the front (12), central stack (4) and rear (2) molds are closed.

After injection and by the natural movement of the opening of the injection molding machine platens (1, 11), a longitudinal opening of the mould is carried out; During this movement the central stack mold (4) moves longitudinally in the direction of the rear mold (2) moving away from the front mold (12), by the movement of the upper (6) and lower (18) sliding plates that move on the upper (5) and lower (16) guide ways by means of the upper (8) and lower (23) hydraulic cylinders, that make up the INTERCHANGEABLE SUPPORT (13).

When the upper (6) and lower (18) sliding plates reach the edge of the upper (9) and lower (15) fixed plates, corresponding to the maximum mold opening stroke, the injected parts are ejected of the cavities formed between the central stack mould (4) and the rear mould (2).

The central stack mold (4) then rotates 180 degrees and the components that make up the mould i.e. the front mold (12), central stack mould (4) and rear mould (2) are again closed longitudinally, by the natural closing movement of the injection moulding machine moving platen (1), in the reverse order that was previously described, bringing the complete to the initial operation position.

The injection of the first component can be carried out by the machine injection nozzle (24) and the second by means of a secondary injection unit, in his case positioned longitudinally or vertically (not shown), but subject to a number of variations, known by prior art.

In order to enable the fitting of the interchangeable support (13) to molds with different dimensions, two upper (10) and lower (14) fitting devices are introduced, permitting the fitting of the height of the upper fixed plate (9) and lower fixed plate (15) respectively.

For the purpose of cooling and for supplying the hydraulic and/or pneumatic actuators, various channels for oil, air, and water (19) are introduced so that supply and return lines are always fed to the INTERCHANGEABLE SUPPORT (13).

As can be seen from FIG. 1. the central stack mold (4) is accessible from both faces, having enough space between the front mold (12), the central stack mold (4) and the rear mold (2) to allow for ejection of the molded parts in these spaces; However it is also possible to rotate the central block 90 degrees, obtaining another possibility to eject the moulded parts.

Another possibility intimately associated is the number of degrees of rotation possible, here described as 180 degrees but having the possibility of, for example, 90 degrees, depending on the number of faces of the central stack mold.

Nomenclature
1) Machine moving platen
2) Rear mold
3) Machine tie-bar
4) Central stack mould
5) Set of upper guide ways
6) Upper sliding plate
7) Upper rotating support plate
8) Upper cylinder
9) Upper fixed plate
10) Upper fitting devices
11) Machine fixed platen
12) Front mold
13) Interchangeable support
14) Lower fitting device
15) Lower fixed plate
16) Set of lower guide ways
17) Lower rotating support plate
18) Lower sliding plate
19) Water, air, and oil supply and return
20) Motor and gear drive
21) Cavities
22) Set of bearings
23) Lower Cylinder
24) Injection nozzle

The invention claimed is:

1. Interchangeable support system for multi-component molds, used for the manufacture of multi-component plastic parts, that can be installed in any conventional injection molding machine, accommodate different stack molds and allows not only rapid change of molds, but also move easily from one injection machine to another, characterized for having an Interchangeable support (13), to append on one of the platens of the clamping unit of an existing conventional injection molding machine, comprising two fixed plates (9 and 15)

parallel between each other, at a 90 degree angle to the Interchangeable support (13), fixed through a set of fitting devices (10 and 14), with the ability to change space between each other, so they could be adapted to the height of a central stack mold (4), a set of sliding plates (6 and 18), attached on the fixed plates (9 and 15) through a set of guide ways (5 and 16), operated by a set of two cylinders (8 and 23), allowing the longitudinal movement; and a set of two rotating support plates (7 and 17) attached on the sliding plates (6 and 18), actioned by a motor and a gear-drive (20), wherein the central stack mold (4) is mounted, a frontal mold (12) is mounted on the inner side of the interchangeable support (13), and a rear mold (2) is mounted on an opposite platen of the clamping unit of the conventional injection molding machine.

* * * * *